United States Patent [19]

Dahl

[11] 3,920,338

[45] *Nov. 18, 1975

[54] FASTENER ASSEMBLY FOR PRELOADING A JOINT

[75] Inventor: Warren F. Dahl, Philadelphia, Pa.

[73] Assignee: Standard Pressed Steel Co., Jenkintown, Pa.

[ * ] Notice: The portion of the term of this patent subsequent to Apr. 16, 1991, has been disclaimed.

[22] Filed: Mar. 26, 1973

[21] Appl. No.: 345,106

Related U.S. Application Data

[63] Continuation-in-part of Ser. No. 285,906, Sept. 1, 1972, Pat. No. 3,803,793, which is a continuation of Ser. No. 28,377, April 14, 1970, abandoned.

[52] U.S. Cl. ............... 403/19; 403/284; 52/758 D
[51] Int. Cl.² ............................................ F16B 7/00
[58] Field of Search ........... 403/408, 282, 285, 388; 52/758 F, 758 D; 151/2; 85/7

[56] References Cited
UNITED STATES PATENTS

| | | | |
|---|---|---|---|
| 3,095,776 | 7/1963 | Brilmyer et al. | 85/7 |
| 3,241,421 | 3/1966 | Siebol | 85/7 |
| 3,295,404 | 1/1967 | Baker | 85/7 |
| 3,421,562 | 1/1969 | Orloff et al. | 151/2 R |
| 3,425,259 | 2/1969 | Baugh | 85/7 |
| 3,560,124 | 2/1971 | Bergere | 85/7 |
| 3,655,227 | 4/1972 | Orloff | 151/2 R X |
| 3,803,793 | 4/1974 | Dahl | 151/2 R |

*Primary Examiner*—Werner H. Schroeder
*Assistant Examiner*—Wayne L. Shedd

[57] ABSTRACT

A method and fastener assembly for preloading a joint wherein a pin having a shank and a head at one end is disposed with the shank portion passing through aligned apertures of a plurality of workpieces to be joined. The shank portion of the pin extends beyond the surface of the workpiece and is provided with an irregular surface configuration. A deformable collar having an initially smooth surfaced internal bore is disposed about the pin and snugged against the adjacent workpiece by a removably positioned means placed in abutting relationship against the free surface of the collar to lightly clamp the joint assembly together to remove free play in the joint. The collar is radially inwardly deformed by a crimping tool so that the initially smooth surfaced internal bore of the collar is deformed to assume a configuration complimentary to the irregular surface configuration of the pin shank and upon continual application of the crimping force an axial elongation of the collar and the shank of the pin is effected to provide a predetermined tension or preload on the joint assembly. After the collar has been deformed, the means to snug the joint together initially is removed.

9 Claims, 4 Drawing Figures

U.S. Patent  Nov. 18, 1975  3,920,338
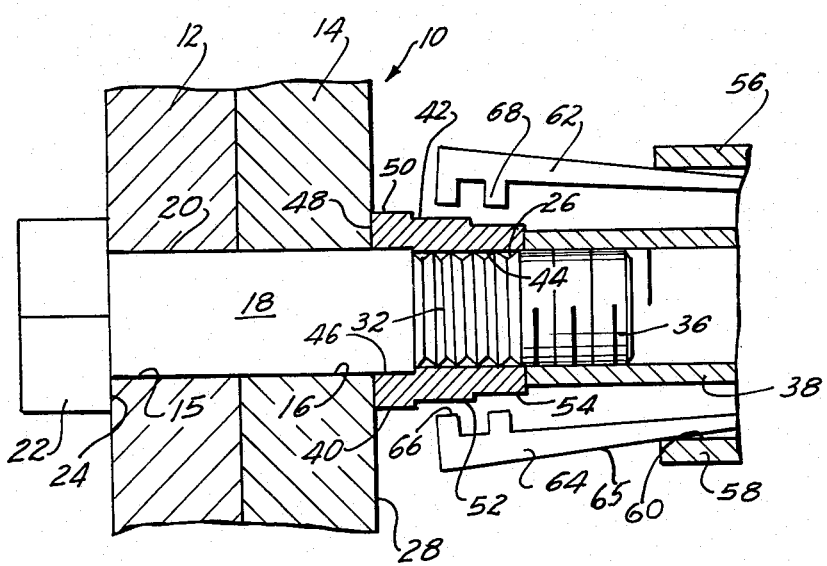
FIG. 1
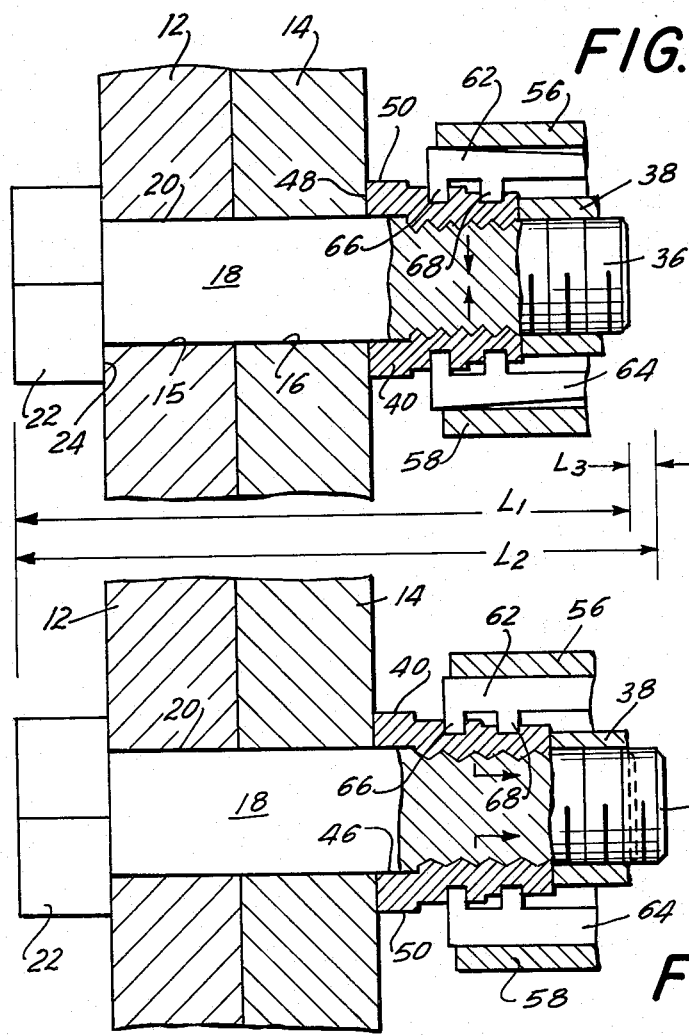
FIG. 2
FIG. 3
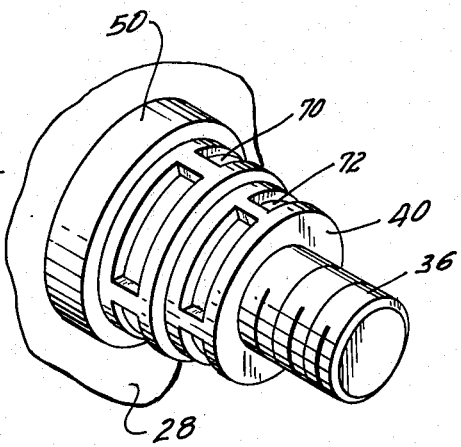
FIG. 4

FASTENER ASSEMBLY FOR PRELOADING A JOINT

This application is a continuation-in-part of copending application Ser. No. 285,906, filed Sept. 1, 1972, now U.S. Pat. No. 3,803,793, issued Apr. 16, 1973, which application was a continuation of application Ser. No. 28,377, filed Apr. 14, 1970, now abandoned.

The present invention relates to fastener assemblies for joints and more particularly to fastener assemblies for joints adapted to place the joint in a stressed or preloaded condition.

In certain applications it is desirable to preload a joint with a high residual tension or clamping force. When such a residual tension, also referred to hereinafter as preload or prestress is applied to a joint, the result is a joint which exhibits a high fatigue life and, also, a tight rigid joint. In addition, it has been found that prestressed joints are able to withstand higher cyclical tensile loads before failing than a similar joint which has not been prestressed.

One of the known methods of preloading a joint assembly is by applying a torque of a predetermined magnitude to a nut and bolt assembly. The degree of prestressing achieved by this method is related to the magnitude of the torque applied. However, the actual degree of prestressing cannot be predetermined accurately because the relationship between torque and preload is not always linear or predictable. This is due in part to the frictional effects between the bolt and nut, and also between the nut and/or bolt head and the surface of the workpiece. In addition, inordinately high torque values are required to achieve a high degree of preload.

Other known methods to prestress a joint include use of a fastener such as a lock-bolt of the type disclosed in U.S. Pat. No. 2,531,048 and high shear rivets of the type disclosed in U.S. Pat. No. 2,355,580. While use of the lock-bolt system in many instances permits the development of consistent, predeterminable high preloads, there is the disadvantage that the pintail is broken off and discarded as scrap. Where large diameter bolts or costly alloys are used, a lock-bolt system of fastening may prove to be needlessly expensive. The high shear rivet type of fastener requires the use of a hammer drive set and further, fasteners of this type can develop only relatively low preload forces in a joint.

Another known method for achieving controlled and uniform prestressing in a joint assembly is shown in U.S. Pat. No. 3,421,562. This patent shows the use of a bolt and a counter-bored nut wherein the bolt is provided with peripheral grooves adjacent its free end. Some of these grooves form a screw thread and the remaining grooves provide an anti-rotation locking feature for the device. The nut is formed with an internal bore which is internally threaded over only a portion of its length and is adapted to threadably engage the bolt with the unthreaded counter-bored portion adjacent the workpiece. After the nut is torqued snug on the bolt, with a relatively low torque, the portion having the unthreaded counter-bore is crimped against the locking grooves. The crimping effects an elongation of this portion of the nut and, since the nut is fixed relative to the bolt by the engagement of the threaded portion of the nut bore and threaded bolt, the elongation of the nut causes the bolt to elongate as well. This elongation in the bolt places it under tension which, together with the tension provided by the initial torquing, results in a joint assembly having a preload.

While this type of assembly can achieve high prestressed joint assemblies this method is not entirely satisfactory because of certain inherent disadvantages. One disadvantage is the cost of manufacture in that a special nut must be prepared provided with a portion having a standard internal thread configuration and a counter-bored portion having a smooth internal bore thus necessitating additional manufacturing operations. In addition, the deviation from a desired predetermined preload when utilizing the fastener assembly shown in the aforesaid U.S. Pat. No. 3,421,562 can be significantly greater than the deviation from a desired predetermined preload attainable with a fastener assembly according to the present invention. Thus, where a high degree of accuracy in achieving a predetermined preload is desired, use of a fastener assembly as shown in the aforesaid patent is not advantageous.

It is therefore an object of the present invention to provide an improved fastener assembly for preloading joints which obviates the inherent disadvantages of prior art devices.

It is a further object of the present invention to provide a fastener assembly and preloaded joint which may be used to very accurately preload an assembled joint consistently to a desired predetermined preload.

It is another object of the present invention to provide a relatively simple and inexpensive means to preload a joint which may be inexpensively manufactured and readily assembled.

In accordance with a preferred embodiment of the present invention there is provided a fastener element such as a pin having a head at one end of a shank with the shank extending through aligned apertures in a plurality of workpieces to be joined and extending beyond the free surface of the outermost workpiece. At least the portion of the shank extending beyond the surface of the workpiece is provided with an irregular surface configuration, which may be helical threads, annular locking grooves, a knurled surface, or a combination of these, and in one preferred embodiment with a standard thread configuration immediately adjacent the end of the shank. A collar member having an initially smooth surfaced internal bore is disposed about the extending portion of the shank and a removable snugging member such as an internally threaded mandrel is threadably engaged on the threaded portion of the shank to snug the joint together and remove any free play in the joint. The collar is then radially inwardly deformed at a plurality of circumferentially spaced locations by a crimping tool so that the initially smooth surfaced internal bore is deformed to conform to the irregular surface configuration on the shank of the pin. After the initial radial deformation, continued application of the radial deforming force effects an axial elongation of the collar which reacts against the free surface of the workpiece and the mandrel to cause an axial elongation of the pin thereby placing the joint in a preloaded condition. The mandrel is then removed and the collar remains fixed on the pin shank due to the interlock between the irregular surface configuration on the shank and the deformed internal bore of the collar.

IN THE DRAWINGS

FIG. 1 is an elevational view partly in section showing the fastener assembly and joint of the present invention during an initial stage of assembly;

FIG. 2 is a view similar to FIG. 1 showing the fastener assembly and joint of the present invention at an intermediate stage of assembly;

FIG. 3 is a view similar to FIGS. 1 and 2 showing the fastener assembly and joint of the present invention after final assembly; and FIG. 4 is a perspective view showing the end of the fastener assembly of the present invention after assembly.

With reference to the drawings and particularly FIG. 1, a joint assembly 10 is shown prior to the application of assembling forces of the fastener assembly of the present invention. Joint 10 comprises workpieces to be joined, such as plate members 12 and 14 in face-to-face abutting relationship. Workpieces 12 and 14 include substantially aligned unthreaded through bores or apertures 15 and 16, respectively therein to accommodate the shank 18 of a fastener member or pin 20. Fastener pin 20 includes a head member 22 at one end having an effective diameter larger than the diameter of the shank 18 and of through bore 15 to form a bearing clamping surface 24 to bear against the exterior surface of workpiece 12.

The axial length of the shank 18 of pin 20 is greater than the thickness of the workpieces 12 and 14 resulting in the end portion 26 of shank 18 extending beyond the free surface 28 of workpiece 14. Extending end portion 26 of the pin shank 18 includes an intermediate segment 30 provided with an irregular exterior configuration 32 to provide a locking surface. Locking surface 32 may have any desired configuration such as standard helical screw threads, annular locking grooves, a knurled surface or any other irregular surface configuration which would form a locking surface when a collar member is radially inwardly deformed so that material of the collar flows inwardly in locking contact with the irregular locking surface 32.

An outer end segment 34 is also provided on pin shank 18 and may be provided with a thread configuration 36 to matingly engage with an internally threaded mandrel member 38 utilized to snug the joint assembly 10 together and to impart a slight preload on the joint assembly sufficient to remove any free play in the joint. The thread configuration 36 which extends beyond the free surface of collar 40 after the joint assembly is snugged together need only be sufficient to provide a gripping contact with mandrel 38. Hence, only a maximum of three full thread forms need be provided.

The joint 10 of the present invention utilizes the technique of crimping a locking collar 40 as the means to impart a predetermined preload to the joint. The locking collar 40 is disposed adjacent the free surface 28 of workpiece 14 about intermediate segment 30 of the extending portion 26 of pin 18. Preferably, the locking collar 40 comprises a collar body 42 having an initially smooth surfaced internal bore 44 through a substantial portion of the axial length of the collar body and may be provided with a counter-bored segment 46 adjacent the end 48 of the collar body to be placed in abutting relationship against the free surface 28 of the workpiece. The exterior of the collar 40 includes a flanged segment 50 of maximum diameter and substantially coextensive with the counter-bored portion 46. Flanged segment 50 extends into an intermediate step-down portion 52 having a diameter slightly less than the diameter across the flange 50 and the collar body 42 terminates in a further step-down portion 54 having a diameter slightly less than the intermediate portion 52.

In assembling the joint 10 of the present invention the pin 20 is inserted through the aligned bores 15 and 16 of workpieces 12 and 14, the collar 40 is disposed about the extending portion 26 of shank 18 and the joint is snugged together to remove free play and impart a slight preload. In the preferred embodiment of the invention described herein the means to snug the joint together is an internally threaded mandrel 38 which is part of the crimping tool 56 and is threadably engaged on the threaded portion 36 of shank 18 just enough to induce a slight preload in the joint and eliminate free play. However, it is to be expressly understood that any other removable means, for example a spring loaded collet or other means to engage the end of the collar body may be employed to induce the slight preload and snug the joint together. At this juncture in the assembly the crimping tool 56 is actuated to crimp or swage collar 40 radially inwardly to induce the predetermined preload on the joint.

Tool 56 includes an annular member on barrel 58 having a tapered circular mouth 60 to engage a crimping collet 62 positioned within barrel 58. The crimping collet 62 includes a plurality of resilient arcuate jaws 64 having tapered outer surfaces 65 which are complimentary to the tapered mouth 60 of barrel 58. Each of the crimping jaws 64 include projections 66 and 68, respectively, protruding radially inwardly and adapted to engage the outer surface of the collar 40.

The removable means to induce a slight preload in the joint and eliminate any free play, for example mandrel 38, is preferably an integral part of the crimping tool 56 so that the initial stage of assembly would be to engage the mandrel 38 on the threaded end 36 of the pin shank 18. The crimping tool is then actuated by moving barrel 58 toward the workpiece, as shown in FIG. 2, so that the coaction between the tapered surfaces 60 and 65 result in radially inward movement of the resilient jaws 64 toward the collar 40. During an initial stage of assembly, as shown in FIG. 2, the radial inward movement of the jaws 64 of the crimping tool, as they contact the outer surface of the collar 40, impart a radially inward deformation of the material of the collar 40 as projections 66 and 68 progressively contact the outer surface of the collar. This initial deformation of the collar is in a radial direction only and assures the collar material flowing radially inwardly and packing into the roots of the locking surface 32 in the intermediate segment 30 of the shank of pin 18. The deformation imparted to the collar by the projections 66 and 68 result in inward deformations or dimples 70 and 72, respectively, see FIG. 4, on the outer surface of the collar and, because of this working, deformations 70 and 72 define collar portions of denser material than the remainder of the collar.

Continued application of the radially inwardly directed deforming force by the crimping tool 56 after the collar material has packed into and around the locking surface of the pin shank, to insure a mating cooperating locking of the collar to the shank, results in a subsequent axial deformation of the collar which acts between the free surface 28 of the workpiece and the backup mandrel 38 to effect an axial elongation of the pin, as shown in FIG. 3. Thus, as shown in FIGS. 2 and 3, the axial length of the pin in the joint assembly increases from a length $L_1$ to a length $L_2$ resulting in a net increase in the length of the pin $L_3$.

It is this axial elongation of the pin caused by the crimping which ultimately determines the magnitude of the preload on the joint and it is the axial elongation of the collar 40 which provides the elongation in the shank of the pin and, therefore, determines the magnitude of the preload applied to the joint. After the desired preload condition has been reached, the crimping tool 56, including the backup mandrel 38, is removed resulting in a joint assembly having the locking collar, as shown in FIG. 4, securely positioned and fixed on the extending portion of the pin shank by reason of the mating cooperation between the inwardly deformed surface of the collar and the locking surface provided on the pin shank. Inasmuch as the collar is fixed to the pin shank by this cooperating locking action, the preload induced in the joint is also fixed.

As shown in the preferred embodiment herein, collar 40 is provided with flange 50 adjacent the end of the collar in bearing contact with the free surface 28 of the workpiece. Also a counterbore 46 may be provided at this end of the collar body to accommodate any unthreaded portion of the pin extending beyond surface 28 of workpiece 14. The flange in collar 40 provides a beneficial result in that the flange prevents peel back of the collar from contact with the free surface 28 of the workpiece during the crimping operation. By insuring the maintenance of maximum surface-to-surface contact between the collar 40 and the free surface of the workpiece the loss of tensile strength of the joint is minimized.

As shown in the preferred embodiment, the shank 18 of pin 20 has an interference fit within the through bores 15 and 16 of the workpieces 12 and 14 with the interference fit providing an anti-rotation feature so that the shank of the pin is not rotated upon the installation and removal of the crimping tool and mandrel 38. However, it is to be understood that an interference fit between the collar shank and the through bores is not necessary and in some applications would not be provided. In this event, an anti-rotation feature may be provided, such as a point drive or irregular surface configuration, to prevent rotation of the pin shank as the backup mandrel is installed or removed.

The fastener and joint assembly of the present invention provides a highly effective method to control the preload induced in a joint with a high degree of accuracy. This high degres of accuracy in attaining a predetermined preload is attributed to the control elongation of the collar 40 and the pin shank 18 attainable when a removable backup means such as mandrel 38 is used only to induce a slight initial preload to remove free play in the joint assembly. This assures that the force exerted during crimping is not wasted in drawing the workpieces together so that distortion in the preload accuracy of the system is minimized. to a great extent. Also, because the locking collar and the backup nut are separate elements the crimping action allows for complete radially inward deformation of the locking collar before axial elongation begins. This action also increases the preload accuracy of the system and is not attainable through the fastening system wherein no removable backup member is provided.

Thus, it is seen that the present invention provides a fastener system and joint assembly which is of relatively simple construction, economical to manufacture and which provides an exceedingly accurate system for providing a predetermined preload on a joint assembly. It has also been found that the predetermined preload accuracy may be markedly improved by inducing more than a slight initial preload and in applications where the ultimate desired preload must be maintained to a high degree of accuracy such preload accuracy may be achieved by inducing a greater preload during the initial snugging step.

While the crimping tool is shown in the preferred embodiment as placing a pair of axially spaced deformations 70 and 72 on the collar body at a plurality of circumferentially spaced locations, it is expressly understood that a single row of circumferentially spaced deformations may also be employed as long as the deformation imparted to the collar is sufficient to lock the collar to the pin shank and effect an axial elongation of the shank. It is also to be understood that a simple crimping tool may be used and a removable means such as a nut may be employed to provide the initial preload and provide the reacting surface during crimping.

I claim:

1. In a joint assembly including a plurality of adjacent workpieces having aligned openings therein, a preload fastening assembly comprising:

a fastener member having a head and shank portion extending through said openings, said head engaging the outer surface of one of said workpieces, said shank portion including a free end projecting beyond the free surface of another of said workpieces, at least one portion of said projecting end of said shank portion provided with a segment having an irregular surface configuration to provide a locking surface and another portion of said projecting end of said shank portion adjacent said free end thereof having a configuration cooperating with a selectively reusable removably positioned abutment means for eliminating free play in said joint assembly prior to inducing the final preload therein, a deformable collar having one end disposed against the free surface of said another workpiece and its other end initially bearing on said abutment means, said collar further having an initially smooth surfaced internal bore surrounding said projecting end of said shank in the vicinity of said irregular surface configuration on said shank, said collar being deformed radially inwardly toward said shank portion at selected areas so that material of said collar extends radially inwardly into interlocking engagement with said irregular surface configuration on said shank portion and axially against both said free surface of said another of said workpieces and said abutment means thereby effecting an axial elongation of said collar and said shank and preloading said joint assembly, after assembly of said joint the interlocking engagement between said collar and said irregular surface configuration on said shank portion developing the only reaction force on said shank fixing the preload in said joint assembly.

2. A joint assembly as defined in claim 1 wherein said another portion of said projecting end of said shank portion includes an end segment provided with external screw threads and said abutment means positioned against the other end of said collar comprises a member threadably engaged on said external screw threads to abut said collar member and snug said joint assembly together.

3. A joint assembly as defined in claim 2 wherein the threaded end segment extending beyond said other end of said collar extends beyond said other end of said collar no more than three full thread forms.

4. A joint assembly as defined in claim 1 wherein said irregular surface configuration on said one portion of said projecting end of said shank comprises a screw thread configuration.

5. A joint assembly as defined in claim 1 wherein said collar is deformed by crimping said collar radially inwardly at a plurality of circumferentially spaced locations.

6. A joint assembly as defined in claim 1 wherein said collar is deformed by crimping said collar radially inwardly at a plurality of circumferentially spaced locations in at least two axially spaced positions along said collar.

7. A joint assembly as defined in claim 1 wherein said collar includes a flanged portion adjacent said one end having a diameter greater than the diameter of the remainder of the collar whereby said flanged portion maintains surface-to-surface contact with said free surface of said another workpiece as said collar is radially inwardly deformed.

8. A joint assembly as defined in claim 1 including means to preclude rotation of said shank portion within said openings in said workpieces during assembly of said joint assembly.

9. In a joint assembly including a plurality of adjacent workpieces having aligned openings therein, a preloaded fastening means comprising, a fastening member having a head and a shank portion extending through said openings, said said head engaging the outer surface of one of said workpieces, said shank portion including a free end projecting beyond the outer surface of another one of said workpieces with at least said free end of said shank portion provided with peripheral thread-like deformations on its exterior surface, some of said thread-like deformations coacting with a selectively reusable removably positioned abutment means for eliminating free play in said joint assembly prior to inducing a final preload therein, a deformable collar having an initially smooth surfaced internal bore surrounding said free end about said thread-like deformations on said shank and having one end engaging the outer surface of said another workpiece and another end initially bearing on said abutment means, portions of said collar being deformed radially inwardly against said shank portion and axially against said workpiece and said abutment means, said inwardly deformed portions defining collar portions of denser material than the remainder of the collar and forming complementary thread-like deformations within the surface of said collar internal bore, said collar being engaged with other of said thread-like deformations on said shank portion, said complementary thread-like deformations and said axial deformation effecting an elongation of said shank portion in the longitudinal direction thereof, whereby the final preload is developed in said joint assembly and is maintained when said removably positioned abutment means is removed.

* * * * *